Sept. 28, 1954  B. SHORE  2,690,166
ROTARY INTERNAL-COMBUSTION ENGINE
Filed June 26, 1951  2 Sheets-Sheet 1
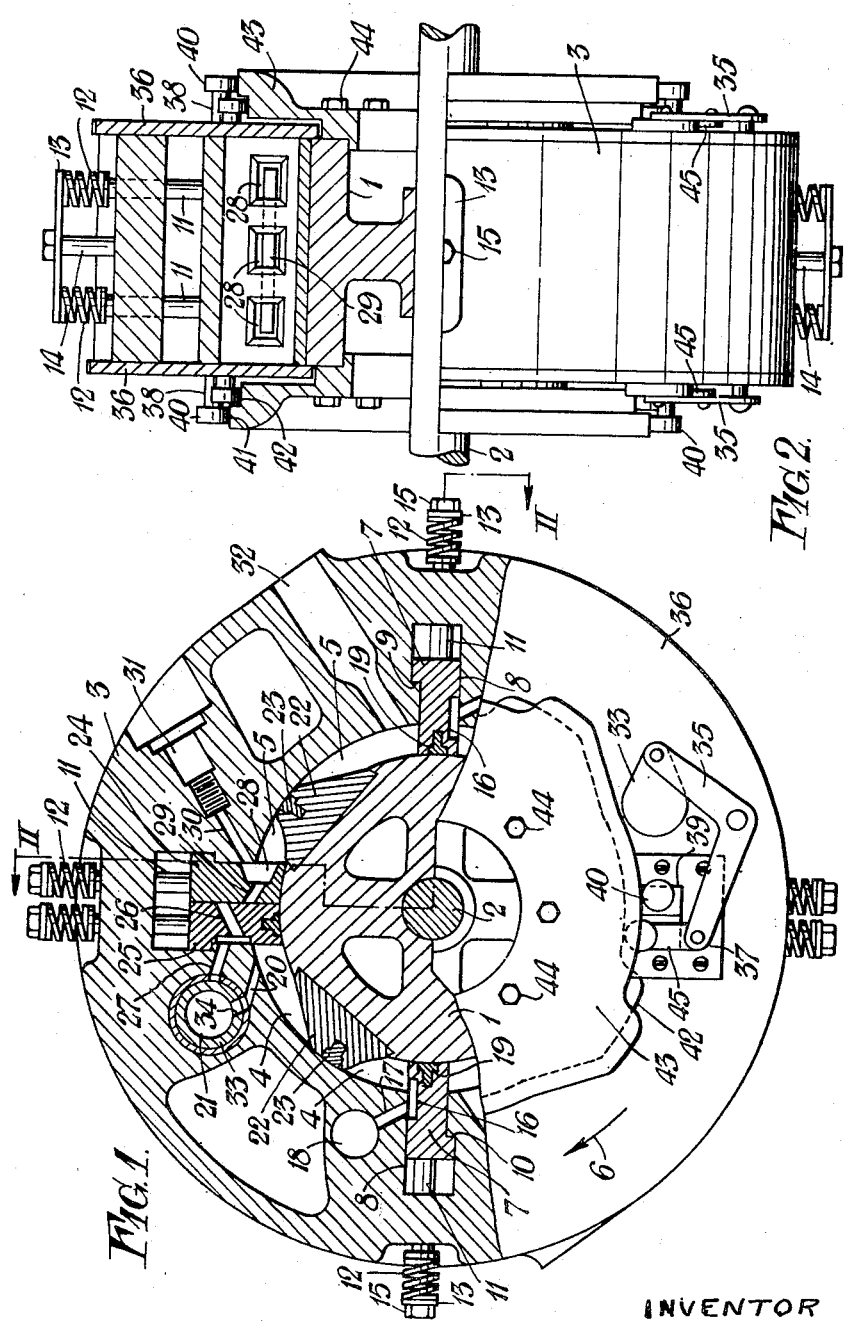
INVENTOR
Benjamin Shore
By George H. Corey
ATTORNEY Sept. 28, 1954            B. SHORE            2,690,166
ROTARY INTERNAL-COMBUSTION ENGINE
Filed June 26, 1951            2 Sheets-Sheet 2
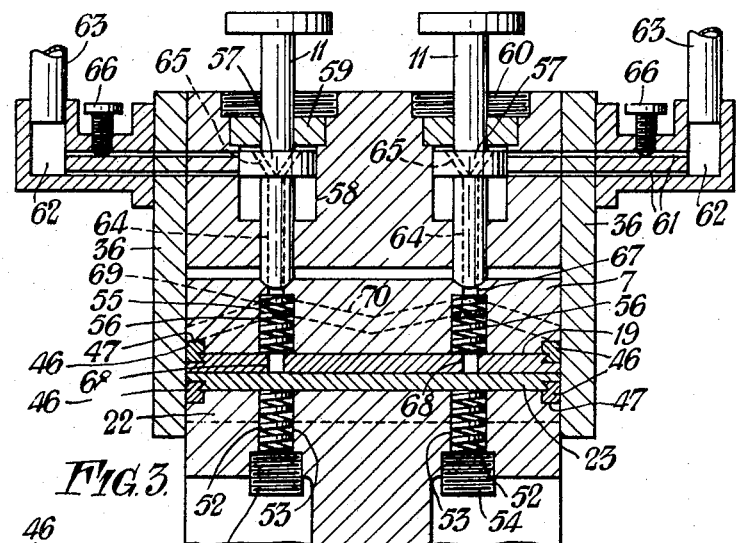
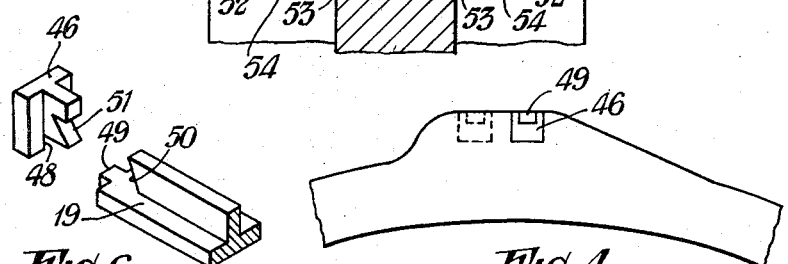
INVENTOR
Benjamin Shore
By
*George H. Carey*
ATTORNEY Patented Sept. 28, 1954

2,690,166

UNITED STATES PATENT OFFICE 2,690,166

ROTARY INTERNAL-COMBUSTION ENGINE

Benjamin Shore, Richmond, England

Application June 26, 1951, Serial No. 233,519

Claims priority, application Great Britain April 10, 1951

3 Claims. (Cl. 123—14)

The present invention relates to rotary internal combustion engines and has for an object to provide an improved rotary internal combustion engine of simplified construction and in which the parts of the engine liable to wear are easily accessible for adjustment or replacement. It is a further object to provide improved sealing means by which economy of fuel consumption is achieved.

A rotary internal combustion engine according to the present invention comprises a rotor and a stator, concentrically mounted so as to provide an annular space therebetween which space is divided into annular compartments by a plurality of radial spring loaded partition members or abutments. The abutments are provided with ports or passages for supplying combustible mixture to the annular compartments and for transferring the combustible mixture from one compartment to another in a manner to be described.

The rotor is provided with a plurality of radially extending vanes adapted to engage the stator and corresponding in number to the number of annular compartments. Means are provided for lifting the abutments in synchronism with the rotation of the vanes so as to permit the passage of the vanes.

The annular compartments are disposed alternately as induction and firing compartments, the induction compartment being closed at its rear end (with respect to the direction of rotation of the vanes) by a single induction abutment having a recess communicating with a passage in the stator to which the combustible mixture is supplied, thus each vane in moving through the induction compartment draws combustible mixture into the compartment. The stator is provided with a further passage positioned adjacent the forward end of the induction compartment and leading to a compression and transfer chamber so that the vane, while drawing in combustible mixture from the rear of the compartment, compresses into the compression chamber the charge drawn in by the preceding vane.

The firing compartment is closed at its rear end by a pair of cooperating abutments, one serving as a sealing abutment and the other as a firing abutment. The sealing abutment is formed with a passage adapted to communicate with a passage in the stator leading to the compression and transfer chamber when the abutment is in the raised position while the firing abutment is provided with a firing chamber and a passage leading therefrom to register with the passage in the sealing abutment when both abutments are in the raised position thereby permitting the compressed charge in the compression chamber to pass to the firing chamber. The forward end of the firing compartment is provided with a passage leading freely to exhaust so that the expanded gases are expelled by the vanes in moving through the compartment. The firing abutment is permitted to fall just after a vane has passed beneath and the charge is fired, the rear of the vane receiving the force of the explosion and the expansion of the gas and is moved forwardly, the front face of the vane expelling the burnt gases of a previously fired charge through the open exhaust passage.

The compression and transfer chamber is provided with a sleeve valve operated by the movement of the firing abutment so that when the firing abutment is raised, the compression chamber is placed in communication therewith through the passage way in the sealing abutment; and, the passage from the induction compartment to the compression and transfer chamber is cut off, thereby avoiding any risk of premature firing of the charge in the induction compartment.

From the foregoing it will be apparent that in conjunction with the compression and transfer chamber, each vane during its rotary movement through the induction and firing compartments effects a complete cycle i. e. induction, compression, firing and exhaust. The rear face of the vane inducing the mixture from the carburettor into the induction compartment and the front face of the same vane compressing the charge, induced by a preceding vane, into the compression and transfer chamber. The same vane, after passing the sealing and firing abutments is moved forward by the firing of the charge which is transferred by the compression and transfer chamber to the firing abutment and acts upon the rear face of the vane, the front face of the vane then sweeping the expanded gases of the previously fired charge through the open exhaust passage.

Sealing strips are provided along the stator engaging surfaces of the vanes and along the rotor engaging surfaces of the sealing abutments. The sealing strips are spring or otherwise loaded, adjustment means being provided for adjusting the pressure on the strips, which means, in the case of the vane sealing strips, is accessible from the exterior of the engine so that the pressure of the strips can be adjusted without the necessity of dismantling the engine. In order to avoid tripping of the sealing strips when passing each other or when passing over apertures in the stator, the strips on the abutments or on the vanes or both are disposed at an angle to the longitudinal axle of the engine.

Sealing members are also provided in the end surfaces of the vanes and abutments and cooperate with cover plates secured to the stator. The sealing members are engaged by the ends of the sealing strips, the arrangement being such that the movement of the sealing strips due to wear serves to urge the sealing members into engagement with the cover plates.

The cover plates are of annular form and extend inwardly from the stator to embrace the periphery of the rotor thus sealing the ends of the annular compartments and have cut out portions to uncover the ends of the stator slots in which the abutments are housed. The slots are then covered in by individual cover plates fitting within the cut out portions and secured to the stator by screws or bolts. Thus when it is desired to gain access to an abutment for removal or adjustment purposes it is only necessary to remove the corresponding individual cover plates. The said individual cover plates are slotted to permit the passage of spindles extending outwardly from the ends of the abutments and having mounted thereon rollers adapted to engage cam surfaces secured to the rotor whereby movement of the abutments is synchronised with the rotation of the rotor and hence of the vanes mounted thereon.

The oscillatory motion of the abutments under the action of the springs and cam surfaces is utilised to pump lubricant, which may be fed to the abutments from a gravity feed oil tank for example, through suitable channels to ensure adequate lubrication of the abutments and sealing strips.

The invention will now be described with reference to the accompanying drawings in which:

Figure 1 is an end elevation partly in section of a rotary internal combustion engine according to the invention;

Figure 2 is a side elevation thereof also partly in section, the section being taken along the line II—II of Figure 1;

Figure 3 is a partial longitudinal section drawn to an enlarged scale of a modified form of construction;

Figure 4 is an end elevation of a portion of the rotor of said modified construction;

Figure 5 is a plan view of the construction shown in Figure 4; and

Figure 6 is an exploded view in perspective of one end of a sealing strip with its corresponding sealing member.

As will be seen from Figures 1 and 2 of the drawings, a rotor internal combustion engine comprises a cylindrical rotor 1 mounted upon a shaft 2 and adapted to revolve within a hollow cylindrical stator 3. The external diameter of the rotor is less than the internal diameter of the stator thereby providing an annular space between the rotor and the stator which space is divided into alternately disposed induction compartments 4 and firing compartments 5 by means of radially extending abutments slidably disposed in slots in the stator.

The rotor 1 is provided upon its periphery with a plurality of vanes 22 corresponding in number to the number of induction and firing compartments and adapted to engage the inner periphery of the stator 3. Sealing strips 23 are provided in the stator engaging surface of the vanes 22.

Each induction compartment is closed at its rear end with respect to the direction of rotation of the rotor indicated by the arrow 6 (Figure 1) by means of an induction abutment 7 sliding in a radial slot 8 in the stator and provided with shoulders 9 adapted to engage corresponding shoulders 10 formed in the sides of the slot so that inward movement of the abutment is limited by the engagement of the shoulders 9 and 10. The outer face of the abutment is engaged by a pair of spindles 11 slidably supported in the stator and in engagement with springs 12 which are in turn engaged by a bridging plate 13 supported upon a bolt 14 extending outwardly from the stator and provided with a nut 15 whereby the distance of the plate 13 from the stator and hence the compression of the springs 12, may be adjusted.

The abutment is provided on its forward face with a recess 16 in communication with a passage 17 in the stator leading from a chamber 18 to which combustible mixture is supplied. The rotor engaging surface of the abutment is provided with a spring loaded sealing strip 19 and it will be noted that by suitable positioning of the shoulders 9 and 10 the rotor may be relieved of substantially all pressure due to the springs 12, the sealing between the abutment and the rotor being effected by the sealing strip 19.

At the forward end of each induction compartment a passage 20 in the stator leads to a compression and transfer chamber 21 so that as a vane 22 moves through the compartment 4, combustible mixture is drawn in through the induction abutment 7 while the mixture already drawn in by the preceding vane is compressed into the compression and transfer chamber 21.

The rear end of each firing compartment 5 is closed by a pair of abutments comprising a firing abutment 24 and a sealing abutment 25. The mounting of these abutments in the stator is similar to that described with reference to the abutment 7 and need not be mentioned in further detail.

The sealing abutment 25 is formed with a channel 26 which is in communication with a passage 27 leading from the compression and transfer chamber 21. The firing abutment 24 is provided with firing chambers 28 in its forward face connected to the rear face by means of channels 29 which channels are adapted to register with the channel 26 in the abutment 25 when the abutment 24 is raised. Immediately in front of the firing abutment 24 a passage 30 in the stator leads to a recess 31 adapted to receive a sparking plug, in the case of a petrol engine, or through which the diesel oil is injected, in the case of a diesel engine.

Thus, when a vane passes the abutments 24 and 25, both abutments are raised in a manner to be hereinafter described and then abutment 25 is allowed to fall thereby placing the firing chambers 28 in communication with the compression and transfer chamber 21 via the channels 29 in abutment 24, channel 26 in the abutment 25 and the passage 27 leading to the said chamber.

As the vane passes the abutments, the sealing abutment 25 is released to seal the firing compartment 5 after which the firing abutment 24 is released and the charge fired and the vane is impelled forwardly at the same time expelling the burnt expanded gases of the previously fired charge through an exhaust passage 32 in the stator.

The compression and transfer chamber 21 is provided with a sleeve valve 33 having an aperture 34 which by rotation of the valve communicates the chamber either with the passage 20 leading from the induction compartment 4 or with the passage 27 leading to the sealing and firing abutments 25 and 24.

Rotation of the valve 33 is effected by the movement of the firing abutment 24 through a link mechanism 35. Thus when the sealing and firing abutments are in the raised position the valve 33 is turned to the position in which the compression and transfer chamber 21 is placed in communication with the ducts 26 while the passage 20 leading from the induction compartment is sealed off by the valve thus avoiding the risk of premature ignition of the freshly drawn in charge in the induction compartment.

A pair of annular side plates 36 are secured to the stator as by bolts for example and engage the rotor so as to seal off the ends of the induction and firing compartments. The side plates 36 are cut away to permit the fitting of individual cover plates 37 for the ends of the abutments. In this manner maintenance and adjustment operations on the abutments is greatly facilitated since in order to gain access to an abutment it is only necessary to remove the corresponding comparatively small and easily handled individual cover plate 37.

The abutments are provided at each end with spindles 38 extending through slots 39 in the cover plates 37 and having mounted thereon rollers 40 adapted to engage cam surfaces 41 and 42 formed on an annular member 43 secured to the rotor by bolts 44.

The inner cam surface 42 is adapted to be engaged by the rollers 40 of the firing abutments 24 while the outer cam surface 41 is adapted to be engaged by the rollers of the induction and sealing abutments 7 and 25. As will be seen from Figure 1 the profile of the cam surfaces follows the contour of the rotor 1 and vanes 22, and the surfaces are disposed so that the firing abutment is lifted slightly after the sealing abutment and is held in the raised position until after the sealing abutment has been released to seal the rear of the firing compartment.

The spindles 38 of the firing abutments carry pivoted arms 45 which are connected to the link mechanism 35 so that as the abutment is raised by the cam surface 42, the sleeve valve 33 is rotated by the link mechanism 35 to release the charge from the compression and transfer chamber 21.

In the construction shown in Figures 3 to 6, Figure 3 shows a longitudinal section through the rotor and stator, the relative position being such that a vane 22 is passing beneath an abutment 7 in the raised position. The sealing strips 19 and 23 in the abutment and vane respectively are of T section and engage at each end with sealing members 46 mounted in recesses 47 in the end surfaces of the vanes and abutments and adapted to engage the side plates 36. The sealing members 46 are also of T section and are recessed as at 48 to receive a tongue 49 on the end of the sealing strip. The web of the sealing strip is cut away at an angle as at 50 to provide an inclined surface which surface is adapted to engage a similarly inclined surface 51 on the sealing member 46 and it will be apparent that movement of the sealing strip outwardly of the vane or abutment will urge the sealing members 46 into engagement with the side plates 36 by reason of the engagement of the respective inclined surfaces.

The sealing strips 23 are spring urged into engagement with the stator by springs 52 in recesses 53 in the rotor. The recesses are closed by means of screw threaded plugs 54 which bear upon the end of the spring so that by rotating the plugs the force exerted by the spring upon the sealing strip is varied. It is thus possible to adjust the pressure of the sealing strips 23 without dismantling the engine. The sealing strips 19 of the abutment are also spring loaded by means of springs 55 contained in recesses 56 in the abutment.

The outward movement of the sealing strips under their spring loading may be limited by any convenient means, thus the sealing strips 23 may be in screwed relation with rods passing through and rotatably mounted in the rim of the rotor so that by turning the rods adjustment of the radial movement of the sealing strips may be made.

In order to avoid tripping of the sealing strips when passing each other or when the vane sealing strips pass over apertures in the stator, the vane sealing strips 23 are set at an angle to the longitudinal axis of the rotor as shown in Figure 5.

In the construction shown in Figure 3, the abutment spindles 11 are each formed with a cylindrical boss 57 adapted to be a sliding fit in recesses 58 in the stator, the recesses being closed by a packing 59 and plug 60 surrounding the upper part of the spindle. Oil is fed to each of the recesses 58 through a pair of ducts 61 communicating with a chamber 62 connected by a tube 63 to a suitable oil gravity feed tank (not shown) secured at the top of the engine or to a support adjacent the engine. A bore 64 extends longitudinally from the lower end of each spindle 11 to communicate with inclined bores 65 extending downwardly from the upper peripheral face of the boss 57 and it will be apparent that reciprocation of the boss 57 in the recess 58 due to the movement of the abutment will cause oil to be pumped through the bore 64. A screw valve 66 is provided in one of each pair of ducts 61 for adjusting the amount of oil fed to the recess 58.

The abutment is provided with bores 67 adapted to register with the bores 64 of the spindles and communicating with the recesses 56 whereby oil forced through the spindles is fed to the recesses 56 whence it passes through apertures 68 in the sealing strip which extend to the rotor engaging face thereof. The abutment is further provided with transversely extending bores 69 leading from the bores 68 to channels 70 in each side face of the abutment thereby providing for lubrication of the side faces of the abutments.

What I claim is:

1. A rotary internal combustion engine comprising a stator having a cylindrical opening therein, a generally cylindrical rotor mounted concentrically within said opening and having a smaller diameter than the opening, said stator and rotor cooperating to define a chamber of annular cross-section, main cover plates secured to the stator and closing the ends of the chamber, at least one pair of abutment means slidably mounted in peripherally spaced radial slots in the stator, springs biasing said abutment means into slidable engagement with the peripheral working surface of the rotor, one of said pair of abutment means comprising an induction abutment member mounted singly in its slot, the other of said pair of abutment means comprising sealing and firing abutment members mounted side by side in common slots, said abutment means defining an induction compartment between each induction abutment member and the next sealing member and a firing compartment between each firing abutment member and the next induction abutment, a firing chamber in each firing abutment member adapted to communicate with the firing compartment when the firing abutment member is in engagement with the rotor, at least one pair of peripherally spaced radially extending vanes on the rotor slidably engaging the inner peripheral working surface of the stator and sweeping through said compartments as the rotor rotates, means operating concurrently with the rotor for retracting the abutments within the slots during passage of the vanes immediately therebeneath, the said induction sealing and firing abutments being at all other times in engagement with the rotor, means for supplying a combustible mixture, means effective upon entry of a vane into said induction compartment to connect said combustible mixture supply means to the portion of the induction compartment behind the moving vane, said vane being effective in its passage through said compartment to draw said mixture into that portion of the compartment behind the vane, means defining a compression and transfer chamber in said stator, valve means for selectively placing said compression and transfer chamber in communication with the sealing abutment end of an induction compartment and the firing chamber in the firing abutment respectively, the said valve means being effective during the passage of the vane through the induction compartment to connect the compression and transfer chamber to the portion of the induction compartment ahead of the vane whereby the mixture ahead of the vane is compressed into the said chamber, and upon entry of the vane into said firing compartment to connect the compression and transfer chamber to the firing chamber of the firing abutment in the retracted position so that upon the said firing abutment reengaging the surface of the rotor after the passage of a vane therebeneath, the compressed mixture is released from the firing chamber into the said compartment, means for igniting the compressed mixture in said firing compartment to effect expansion of the gases therein and consequent expansion of said firing compartment portion and movement of the vane and the rotor, and means for connecting the firing compartment portion ahead of the vane to an exhaust passage so that the vane movement expels the gases therefrom.

2. A rotary engine as claimed in claim 1 wherein the said valve is operatively connected to the firing abutment whereby movement of the abutment inwardly of its slot effects operation of the valve to seal off the compression and transfer chamber from the induction compartment and release the compressed mixture from the chamber into the firing chamber of the firing abutment.

3. In a rotary internal combustion engine, the combination of a stator, a rotor rotatably mounted therein, abutment members slidably mounted in radial slots in the stator, springs biasing said abutment members into engagement with the rotor, spindles slidably supported in the stator and held in engagement with the abutment members by said springs positioned exteriorly of the stator, a cylindrical boss on each of said spindles and sliding in a recess in the stator to which lubricating oil is supplied, each of said spindles having a bore extending longitudinally thereof and communicating at one end with a surface of said boss and at the other end with a bore in the associated abutment, said abutment having channels extending from said last mentioned bore to the rotor-engaging and side faces of the abutment whereby lubricant is fed to the said faces.

References Cited in the file of this patent

UNITED STATES PATENTS

| Number | Name | Date |
|---|---|---|
| 723,656 | Dunn | Mar. 24, 1903 |
| 880,453 | Hokanson | Feb. 25, 1908 |
| 1,228,072 | Siner | May 29, 1917 |
| 1,269,937 | Hutsell | June 18, 1918 |
| 1,409,986 | White | Mar. 21, 1922 |
| 1,769,822 | Blackman | July 1, 1930 |
| 2,172,039 | Shore | Sept. 5, 1939 |
| 2,461,377 | Gilson | Feb. 8, 1949 |

FOREIGN PATENTS

| Number | Country | Date |
|---|---|---|
| 104,168 | Switzerland | Apr. 1, 1924 |
| 265,220 | Great Britain | Nov. 17, 1927 |